FOUR-LAYER PRESSURE SENSITIVE BARRIER TYPE TRANSDUCER DEVICE
Filed April 8, 1964
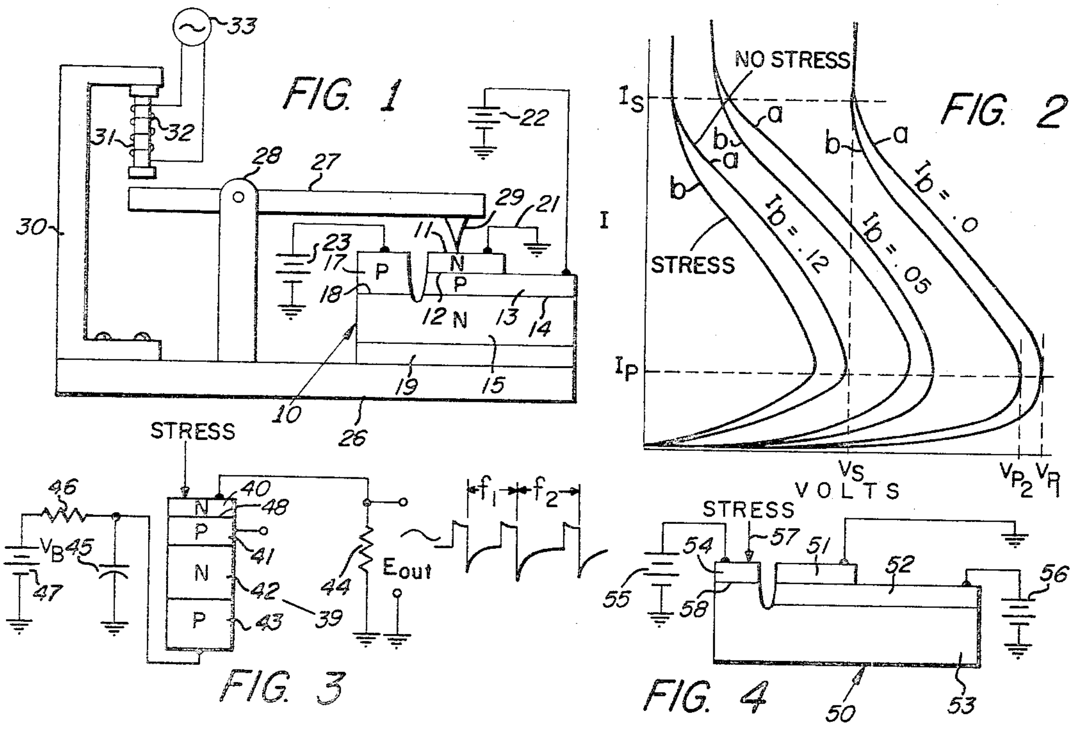
FIG. 1, FIG. 2, FIG. 3, FIG. 4
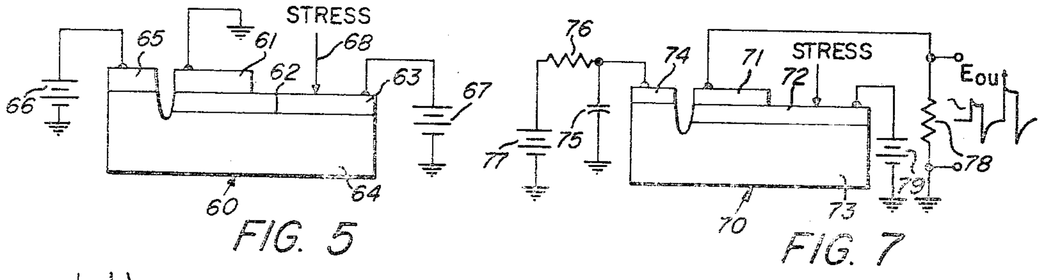
FIG. 5, FIG. 7
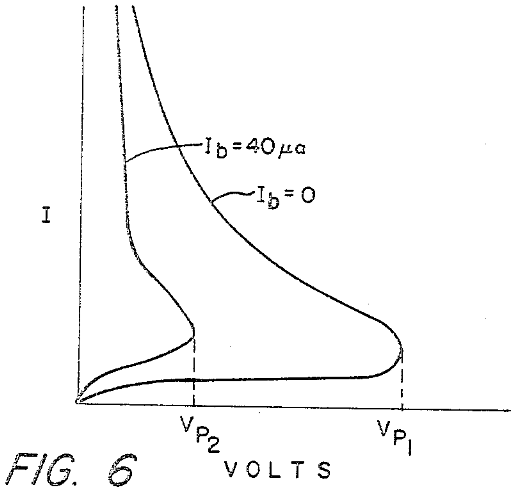
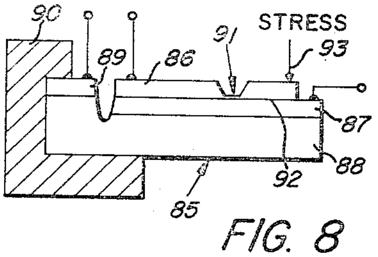
FIG. 8
INVENTORS
ANTHONY P. SCHMID
ROGER F. NELSON
WILHELM RINDNER
BY Donald Brown
ATTORNEY 3,339,085

FOUR-LAYER PRESSURE SENSITIVE BARRIER TYPE TRANSDUCER DEVICE

Anthony P. Schmid, Toledo, Ohio, Roger F. Nelson, Mountain View, Calif., and Wilhelm Rindner, Lexington, Mass., assignors to Raytheon Company, Lexington, Mass., a corporation of Delaware Filed Apr. 8, 1964, Ser. No. 358,258
6 Claims. (Cl. 307—88.5)

The present invention relates generally to semiconductor signal translating devices and, more particularly, to four-layer semiconductor strain transducer devices having four semiconductor regions.

The invention is especially suitable for use in pressure gauges, oscillators and other devices in the class of electromechanical transducers and motion responsive devices.

This conventional four-layer semiconductor device of this invention is the type disclosed and described in the article, "PNPN Transistor Switches," by J. L. Moll et al., Proceedings of the IRE, vol. 44, September 1956. Additionally, a description of the four-layer device, as utilized in this invention, is described in the United States Patents No. 2,988,677 and No. 3,036,226 issued in the name of Solomon L. Miller.

The prior art has made use of the negative resistance characteristic of the four-layer device by applying a bias across the two outermost layers. Additionally, biasing has been applied to one of the base regions of the prior art devices to control the breakdown of these devices, but the prior art structures have not provided a means for electromechanically controlling the characteristics, such as capacitance, negative resistance and turn over characteristics of four-layer devices in accordance with the electromechanical or mechanically produced anisotropic stresses applied to a surface of the devices to produce a strain confined to a small region of a junction of the device.

Accordingly, is is a principal object of this invention to provide a four-layer semiconductor strain transducer.

It is an additional object of this invention to provide a four-layer semiconductor strain transducer which is highly sensitive to a concentrated, nonuniform, anisotropic stress.

It is a further object of this invention to provide an oscillator circuit utilizing a four-layer semiconductor multiple junction device having either the output frequency or the output amplitude or both varied in accordance with a stress transmitted to a junction of said device.

In accordance with the preferred embodiment of this invention, a variable, concentrated, nonuniform, anisotropic stress is applied to a small surface area of a conventional four-layer transistor or semiconductor device to produce a strain in a junction or barrier region within said device, thereby altering the current-voltage characteristic of the device.

In one embodiment, the stress is applied to the emitter base junction of the device; in another embodiment, a stress is applied to the junction lying between the two base regions; and in still another embodiment, a stress is applied to the junction between the collector and base regions. Further embodiments show the utilization of these stressed four-layer devices in relaxation oscillator circuits. Additionally, a notched strain sensitive four-layer device is disclosed.

Other objectives and features of this invention will become apparent from the following description taken in conjunction with the following drawings wherein:

FIG. 1 is a side elevational view of a four-layer semiconductor device including means for electromechanically applying a stress to a surface of said device;

FIG. 2 is a graph of the voltage-current characteristic of the device of FIG. 1 showing the effect of stress on the device;

FIG. 3 is a schematic diagram of a relaxation oscillator utilizing a stress applied to the emitter base junction to alter the frequency of the oscillator;

FIG. 4 is a side elevational view of a four-layer semiconductor device showing a stress applied in a manner so as to produce a strain within the collector to base junction;

FIG. 5 is a side elevational view of a four-layer semiconductor device showing stress applied in a manner so as to produce a strain in the junction lying between the two center base regions;

FIG. 6 is a graph of the voltage-current characteristic of the device of FIG. 5 depicting the changes with applied stress to the device of FIG. 5;

FIG. 7 is a side elevational view of the device of FIG. 5 including circuit elements in schematic form to provide a relaxation oscillator wherein the output from the oscillator is altered by stress applied to the device; and FIG. 8 is a notched cantilever version of the four-layer device wherein the notch is utilized to strain a junction or barrier within the device.

Referring first to FIGS. 1 and 2, the transducer 10 is an NPNP triode constructed in accordance with the prior art. The triode comprises a first N-type region 11, a first P-type region 13, a second N-type region 15 and a second P-type region 17. Region 11 acts as the emitter of the device, regions 13 and 15 are the intermediate bases of the device and region 17 is the collector region of the device. Regions 11 and 13 have a rectifying junction or barrier 12 therebetween. Junction 12 will be for the purposes herein known as the first junction or the emitter-to-base junction. Between intermediate base regions 13 and 15 a second junction or barrier 14 is formed. This will be henceforth known as the second junction or base-to-base junction of the device. Between regions 15 and 17 there is formed a third junction 18, which henceforth will be known as the third junction or the collector-to-base junction.

The triode transducer 10 has mounted on its region 15 an insulating support 19. This insulating support is, in turn, supported by a base 26 which comprises a portion of a structure for applying a stress to a surface of region 11 of device 10. The emitter region 11 is connected by way of wire 21 to ground. The collector region 17 is connected to battery 23 and the first base region 13 is connected to a second battery 22 which provides a base current bias for the device. Coupled to the supporting base 26 is a member 28 which pivotally supports a bar 27 having a pointed member 29 disposed such that its point bears down upon the surface of region 11, preferably perpendicular to the junction 12. The bar 27 is of a material which is attracted by a magnet. Also coupled to the support base 26 is a member 30 which supports an electromagnet 31 having windings 32. A source of energy is shown at 33 for providing electrical energy to vibrate and attract bar 27 in a manner such that the pointed member or a vibratile member 29 applies a stress to the surface of region 11.

It has been found in practice that the sensitivity of the device of FIG. 1 is greatly enhanced by utilizing NPNP of "PNPN" devices wherein the distance of the junction to be stressed from the point where the stress is applied to a surface of the device is less than .010″. It appears that the shallowness of the junction is of prime importance with respect to achieving highly sensitive devices. Additionally, to achieve a highly sensitive strain transducer device, it has been determined that pointed members having tips with radiuses of curvature less than about 250 microns produce good results. It has been further determined that radiuses of curvatures of less than about 50 microns produce the best observed results. Furthermore, application of the stress at 90° to the underlying junction has been found to increase the sensitivity of the device.

In FIG. 2, there is disclosed three families of curves for $I_b$=0.5 milliamp and .12 milliamp, respectively. The curves marked *a* represent no stress applied and the curves *b* represent the application of a stress to strain the junction 12 of the device in FIG. 1. Forces in the order of 4 grams magnitude have produced the results shown in FIG. 2.

FIG. 3 discloses the application of the four-layer device as the active element of a strain transducer relaxation oscillator. In this circuit, there is obtained a conversion of an analog input signal to a digital output signal wherein the magnitude of the stress applied to the base emitter junction of the transducer element is translated into frequency of relaxation oscillations. The relaxation oscillator comprises the strain transducer four-layer element 39 having an N-layer 40, a P-layer 41, an N-layer 42 and a P-layer 43, N-layer 40 being the emitter, P-layer 41 being the first base, N-layer 42 being the second base and P-layer 43 being the collector of the active element.

The emitter is connected to an output resistor 44 and the collector is connected to a circuit comprising a capacitor 45, a resistor 46 and a bias source 47. A stress is applied perpendicular to the junction 48 by a pointed object, such as object 29 shown in FIG. 1. A stress is preferably applied perpendicular to the junction 48. The operation of the circuit is as follows: the capacitor 45 will charge to the value of $V_{p1}+I_pR_{44}$. The $V_p$ (turnover voltage) and $I_p$ (turnover current) are shown on the characterteristic curve of FIG. 2 for $I_p=0$ which is equivalent to the operation of the device of FIG. 1 as a diode. At this value of voltage, the four-layer device, which is acting as a diode inasmuch as there is no bias applied to the base 41, will switch along the characteristic to a point determined by $R_{44}$, the load resistor, the capacitor 45 will then discharge through the four-layer device 39 and $R_{44}$ until the current reaches $I_s$, the value of the current at the onset of a negative resistance region shown in FIG. 2. The diode or four-layer element 39 then switches to a point on its characteristic before the onset of the negative resistance region where the voltage is equal to the voltage remaining on the capacitor 45 $(V_s+I_sR_{44})$. The capacitor will again start to charge and the cycle will be repeated. The voltage on the capacitor 45 varies then between $V_p+I_pR_{44}$ and $V_s+I_sR_{44}$. As the value $R_{44}$ is chosen such that it is small compared to $R_{46}$ so that the discharge time is negligible, the frequency of the output signal will be determined merely by the time required to charge the capacitor from $V_s+I_sR_{44}$ to $V_{p1}+I_pR_{46}$. If we assume that $I_sR_{44}+V_s$ is much smaller than $V_{p1}$, the time between discharges will be given by $$t_1=R_1C\ \ln\frac{V_B}{V_B-V_{p1}}$$

where $V_B$ is the bias voltage. To first order in $V_{p1}/V_B$ this will go as $V_{p1}$. If then the stress is applied to the emitter base junction 48 so as to change $V_p$, there will result in a corresponding change in the frequency of the relaxation oscillation and, therefore, a pulse train, whose frequency varies as stress is applied, is obtained. This is shown in the output signal represented in FIG. 3 wherein two frequencies of oscillation, $F_1$ and $F_2$ are obtained.

Similar functions can be achieved with the four-layer device operating as a triode with stress applied to junctions other than the emitter, such as, for example, the junction lying between the first and second bases or the junction lying between the second base and the collector. A circuit, utilizing the stressing of the junction between the first and second bases, will be described in conjunction with the description of FIG. 7.

Referring now to FIG. 4, there is disclosed a four-layer device having an emitter layer 51, a first base layer 52, second base layer 53 and a collector layer 54. Biasing is applied to the collector layer 54 by a source 55 and biasing is applied to the first base 52 by a source 56. Stress is then applied as shown by arrow 57 to the junction 58 lying between the collector region 54 and the base region 53. Similar type curves as those obtained for the stressing of the emitter base junction are obtained in accordance with applied stress. This device can be also used in the relaxation oscillator circuit of FIG. 3 to alter the characteristics of the characteristic I-V curves and thereby provide a change in frequency output from the device of FIG. 3.

In FIG. 5, a four-layer strain transducer 60 is shown comprising semiconductor emitter region 61, base region 63, second base region 64 and collector region 65. Biasing is provided to the first base region 63 by a source 67. A stress is applied to a surface of base region 63 so as to produce a strain in junction 62 separating regions 63 and 64.

FIG. 6 shows the effect of an application of stress to produce a strain in the junction 62. Straining of the junction 62 causes a modulation of the base current which varies in accordance with the amount of stress or force applied to the exposed surface of the region 63 This effect is shown for $I_b=0$ which is equivalent to no stress and for the flowing of 40 microamperes of $I_b$. Additionally, it is to be noted that the application of stress to the surface of region 63 alters the turnover voltage. In this case, as in the situation of FIG. 1, it is to be understood that the utilization of a pointed member having dimensions less than about 250 microns radius of curvature and also utilizing shallow depth junctions, that is, junctions which lie very close to the surface to which the stress is applied, for example, in the order of less than .010", provides a highly sensitive transducer. Furthermore, the stress shown in FIG. 5 should be preferably applied perpendicular to the underlying junction.

FIG. 7 shows the utilization of the device of FIG. 5 in a relaxation triode oscillator circuit. The triode transducer 70 comprises a first region 71, a second region 72, a third region 73 and a fourth region 74 fabricated in the conventional manner. Coupled to the collector region 74 is a capacitor 75, a resistor 76 and a bias source 77. A resistor 78 is connected to the emitter region 71 and a bias current is provided to the base region 72 by a source 79. By varying the stress applied to a surface of region 72, the current flowing through the transducer 70 can be altered in a manner as shown in FIG. 6 and, accordingly, the output signal from the relaxation oscillator can be varied in both frequency and amplitude.

Referring now to FIG. 8, there is shown a cantilever arrangement of a four region semiconductor device 85. Device 85 comprises a first emitter region 86, a first base region 87, a second base region 88 and a collector region 89. One end of the transducer 85 is securely held by a rigid support 90 such that the device 85 can move about one end. A notch 91 is provided for producing a strain in a junction 92 lying between regions 86 and 87. A strain will be produced in this junction 92 by an application of a stress shown by arrow 93 which bends the transducer device in a manner such that notch 91 will produce dislocations in the lattice structure of the material to strain the junction. Although, in this instance the notch is shown in the emitter region, notches could be utilized in other regions for stressing either of the two base junction or the collector base junction.

Thus, a four region strain transducer semiconductor device has been disclosed which relies upon the application of a non-uniform, concentrated anisotropic stress to a surface of said device to produce a strain within a junction or barrier separating regions of the device, thereby effecting the I-V characteristics. Furthermore, there has been disclosed circuitry utilizing such a device to alter either the frequency or the amplitude or both of the voltage output signal from an oscillator circuit. Further it is to be understood that, although only two methods of applying a stress have been described in any detail, other techniques, which are mechanically equivalent, such as, for example, speaker diaphragms or other equivalents, could be utilized to apply a stress to the surface of this device.

Accordingly, it is desired that this invention not be limited except as defined by the appended claims.

What is claimed is:

1. A strain-sensitive transducer device comprising a semiconductor body having four layers, the first and third layers being of one conductivity type, and the second and fourth layers being of opposite conductivity type, one of said layers having a plane surface, barrier junctions between said layers, one of said junctions extending in a plane parallel with said plane surface and disposed closer to said surface than the other junctions, force-inducing means for applying compression stress to a point on said surface for introducing strain in a small region of the underlying parallel junction and circuit means for forward biasing said parallel junction.

2. A strain-sensitive transducer as set forth in claim 1 wherein the force-inducing means comprises a stylus.

3. A strain-sensitive transducer device as set forth in claim 1 wherein said force-inducing means comprises a rigid support, an actuating member mounted for movement in said support, a stylus carried by said member and positioned in engagement with said plane surface, and electrical signal-responsive means for moving said member and causing said stylus to press upon said surface with varying degrees of force in accordance with a signal applied thereto.

4. A strain-sensitive transducer device as set forth in claim 1 wherein one end of the body is rigidly supported and said surface is provided with a groove extending transversely thereof with its inner surface terminating short of said parallel junction, said groove being located between the rigidly supported end of the body and the point at which pressure is applied to said surface whereby the small of the junction closest to said groove will be stressed.

5. A strain-sensitive transducer device as set forth in claim 1 wherein said second and fourth layers are disposed on the same side of said third layer and physically separated from one another, and said first layer is located on the second layer, said plane surface being located on the first layer.

6. A strain-sensitive transducer device as set forth in claim 1 wherein said first, second, third and fourth layers are disposed one upon another in that order, and the first layer has said plane surface thereon.

References Cited

UNITED STATES PATENTS

| | | | |
|---|---|---|---|
| 2,632,062 | 3/1953 | Montgomery | 307—88.5 |
| 2,866,857 | 12/1958 | Andrews | 317—235 |
| 2,898,477 | 8/1959 | Hoesterey | 307—88.5 |
| 2,929,885 | 3/1960 | Mueller | 307—88.5 |
| 3,107,277 | 10/1963 | Rogers | 307—88.5 |
| 3,144,522 | 8/1964 | Bernstein | 317—235 |
| 3,186,217 | 6/1965 | Pfann | 73—88.5 |
| 3,213,681 | 10/1965 | Pearson | 317—235 |
| 3,250,965 | 5/1966 | Rindner | 317—234 |
| 3,261,989 | 7/1966 | Weinstein | 307—88.5 |

JOHN W. HUCKERT, *Primary Examiner.*

JAMES D. KALLAM, *Examiner.*

R. F. SANDLER, *Assistant Examiner.*